United States Patent
Israelsson et al.

(10) Patent No.: US 8,505,654 B2
(45) Date of Patent: Aug. 13, 2013

(54) POLYCRYSTALLINE DIAMOND

(75) Inventors: Gustav Johnny Israelsson, Roberstsfors (SE); Karolina Elisabet Hannersjö, Roberstsfors (SE); Pär Erik Håkan Schelin, Roberstsfors (SE)

(73) Assignee: Element Six Limited, County Clare (IE)

( * ) Notice: Subject to any disclaimer, the term of this patent is extended or adjusted under 35 U.S.C. 154(b) by 340 days.

(21) Appl. No.: 12/901,629

(22) Filed: Oct. 11, 2010

(65) Prior Publication Data

US 2011/0083907 A1    Apr. 14, 2011

Related U.S. Application Data

(60) Provisional application No. 61/250,071, filed on Oct. 9, 2009.

(51) Int. Cl.
*E21B 10/46* (2006.01)
*B23B 5/16* (2006.01)

(52) U.S. Cl.
USPC .......................................... 175/425; 175/434

(58) Field of Classification Search
USPC ........ 175/425, 428, 433, 435, 374; 76/108.2, 76/108.4
See application file for complete search history.

(56) References Cited

U.S. PATENT DOCUMENTS

| | | | |
|---|---|---|---|
| 3,745,623 A | 7/1973 | Wentorf, Jr. et al. | |
| 4,303,442 A | 12/1981 | Hara et al. | |
| 4,380,471 A | 4/1983 | Lee et al. | |
| 4,604,106 A * | 8/1986 | Hall | 51/293 |
| 4,874,398 A | 10/1989 | Ringwood | |
| 4,916,869 A | 4/1990 | Oliver | |
| 4,954,139 A * | 9/1990 | Cerutti | 51/293 |
| 5,010,043 A | 4/1991 | Ringwood | |
| 5,078,393 A | 1/1992 | Morasiewicz | |
| 5,116,416 A | 5/1992 | Knox et al. | |
| 5,127,923 A | 7/1992 | Bunting et al. | |
| 5,154,550 A | 10/1992 | Isobe et al. | |
| 5,304,342 A | 4/1994 | Hall, Jr. et al. | |
| 5,312,653 A | 5/1994 | Buchanan | |
| 5,328,753 A | 7/1994 | Boaz | |
| 5,370,195 A | 12/1994 | Keshavan et al. | |
| 5,431,239 A | 7/1995 | Tibbitts et al. | |

(Continued)

FOREIGN PATENT DOCUMENTS

| | | |
|---|---|---|
| CA | 1285776 C | 7/1991 |
| CA | 1289367 C | 9/1991 |

(Continued)

OTHER PUBLICATIONS

PCT Search Report for PCT/EP20010/065198 dated Mar. 3, 2011.

*Primary Examiner* — Kenneth L Thompson
(74) *Attorney, Agent, or Firm* — Bryan Cave LLP

(57) ABSTRACT

A PCD composite compact comprising a PCD structure bonded at an interface to a substrate comprising cemented carbide material; the PCD structure comprising a mass of directly inter-bonded diamond grains having a mean size of at most about 4 microns, and the PCD structure comprising at least about 0.05 weight percent refractory metal or carbide of a refractory metal selected from the group comprising W, Ti, V, Cr, Zr, Nb, Mo, Hf and Ta; and at least the cemented carbide material proximate the interface having a content of metallic binder material of at most about 6 weight percent.

22 Claims, 5 Drawing Sheets

(56) References Cited

U.S. PATENT DOCUMENTS

| | | | |
|---|---|---|---|
| 5,441,817 A | 8/1995 | Rai | |
| 5,535,838 A | 7/1996 | Keshavan et al. | |
| 5,594,931 A | 1/1997 | Krall et al. | |
| 5,641,921 A | 6/1997 | Dennis et al. | |
| 5,645,617 A | 7/1997 | Frushour | |
| 5,667,028 A | 9/1997 | Truax et al. | |
| 5,697,994 A | 12/1997 | Packer et al. | |
| 5,792,403 A | 8/1998 | Massa et al. | |
| 5,928,071 A | 7/1999 | Devlin et al. | |
| 5,976,205 A | 11/1999 | Andrews et al. | |
| 6,135,218 A | 10/2000 | Deane et al. | |
| 6,216,805 B1 | 4/2001 | Lays et al. | |
| 6,227,318 B1 | 5/2001 | Siracki | |
| 6,241,035 B1 | 6/2001 | Portwood | |
| 6,258,139 B1 | 7/2001 | Jensen | |
| 6,261,329 B1 | 7/2001 | Ogata et al. | |
| 6,270,548 B1 | 8/2001 | Campbell et al. | |
| 6,287,489 B1 | 9/2001 | Rolander et al. | |
| 6,290,008 B1 | 9/2001 | Portwood et al. | |
| 6,342,301 B1 * | 1/2002 | Yoshida et al. | 428/408 |
| 6,368,377 B1 | 4/2002 | Bryant et al. | |
| 6,454,027 B1 | 9/2002 | Fang et al. | |
| 6,478,887 B1 | 11/2002 | Sue et al. | |
| 6,651,757 B2 | 11/2003 | Belnap et al. | |
| 6,655,845 B1 | 12/2003 | Pope et al. | |
| 6,878,181 B2 | 4/2005 | Carpenter | |
| 7,017,677 B2 | 3/2006 | Keshavan et al. | |
| 7,282,079 B2 | 10/2007 | Mizuno et al. | |
| 7,288,132 B2 | 10/2007 | Chun et al. | |
| 7,350,601 B2 | 4/2008 | Belnap et al. | |
| 7,387,345 B2 | 6/2008 | Hall et al. | |
| 7,396,086 B1 | 7/2008 | Hall et al. | |
| 7,431,566 B2 | 10/2008 | Gray et al. | |
| 7,438,741 B1 | 10/2008 | Bangaru et al. | |
| 7,464,993 B2 | 12/2008 | Hall et al. | |
| 7,473,287 B2 | 1/2009 | Belnap et al. | |
| 7,475,743 B2 | 1/2009 | Liang et al. | |
| 7,553,350 B2 | 6/2009 | Kuroda et al. | |
| 7,556,668 B2 | 7/2009 | Eason et al. | |
| 7,588,102 B2 | 9/2009 | Hall et al. | |
| 7,694,757 B2 * | 4/2010 | Keshavan | 175/434 |
| 2001/0008190 A1 | 7/2001 | Scott et al. | |
| 2002/0043407 A1 | 4/2002 | Belnap et al. | |
| 2003/0019106 A1 | 1/2003 | Pope et al. | |
| 2004/0062928 A1 | 4/2004 | Raghavan et al. | |
| 2004/0140132 A1 | 7/2004 | Middlemiss | |
| 2004/0159471 A1 | 8/2004 | Azar et al. | |
| 2004/0228694 A1 | 11/2004 | Webb et al. | |
| 2005/0050801 A1 | 3/2005 | Cho et al. | |
| 2007/0089913 A1 | 4/2007 | Desai et al. | |
| 2007/0092727 A1 | 4/2007 | Kosters et al. | |
| 2007/0157670 A1 | 7/2007 | Sung | |
| 2008/0023230 A1 | 1/2008 | Cho | |
| 2008/0073126 A1 * | 3/2008 | Shen et al. | 175/434 |
| 2008/0073127 A1 | 3/2008 | Zhan et al. | |
| 2008/0099250 A1 | 5/2008 | Hall et al. | |
| 2008/0100124 A1 | 5/2008 | Hall et al. | |
| 2008/0120163 A1 | 5/2008 | Hall et al. | |
| 2008/0302579 A1 | 12/2008 | Keshavan et al. | |
| 2008/0314214 A1 | 12/2008 | Tank | |
| 2009/0022560 A1 | 1/2009 | Liemke | |
| 2009/0071727 A1 | 3/2009 | Keshavan et al. | |
| 2009/0090563 A1 | 4/2009 | Voronin et al. | |
| 2009/0117372 A1 | 5/2009 | Zhuk et al. | |
| 2009/0133938 A1 | 5/2009 | Hall et al. | |
| 2009/0178345 A1 | 7/2009 | Russell et al. | |
| 2009/0218146 A1 | 9/2009 | Fang et al. | |
| 2009/0263308 A1 | 10/2009 | Hall et al. | |
| 2009/0273224 A1 | 11/2009 | Hall et al. | |
| 2010/0043302 A1 * | 2/2010 | Tank et al. | 51/307 |
| 2011/0024201 A1 * | 2/2011 | Scott et al. | 175/428 |
| 2011/0061944 A1 * | 3/2011 | Scott et al. | 175/428 |
| 2011/0253459 A1 * | 10/2011 | Davies et al. | 175/428 |

FOREIGN PATENT DOCUMENTS

| | | |
|---|---|---|
| EP | 0 196 777 A1 | 10/1986 |
| EP | 0 385 316 A2 | 9/1990 |
| EP | 0 493 351 A2 | 7/1992 |
| EP | 0 517 460 A2 | 12/1992 |
| EP | 0 619 382 A1 | 10/1994 |
| EP | 0 709 353 A2 | 5/1996 |
| EP | 0 865 876 A2 | 9/1998 |
| EP | 0 974 566 A1 | 1/2000 |
| EP | 0 976 444 A2 | 2/2000 |
| EP | 0 982 276 A1 | 3/2000 |
| EP | 1 028 171 A1 | 8/2000 |
| EP | 1 120 541 A1 | 8/2001 |
| EP | 1 338 582 A2 | 8/2003 |
| EP | 1 775 275 A1 | 4/2007 |
| EP | 2 107 045 A1 | 10/2009 |
| EP | 2 113 496 A1 | 11/2009 |
| GB | 2024843 A | 1/1980 |
| GB | 2461198 A | 12/2009 |
| JP | 53114589 A | 10/1978 |
| JP | 6279115 A | 10/1994 |
| JP | 7156003 A | 6/1995 |
| JP | 9316587 A | 12/1997 |
| JP | 10298700 A | 11/1998 |
| JP | 10310838 A | 11/1998 |
| JP | 11245103 A | 9/1999 |
| JP | 2000144301 A | 5/2000 |
| JP | 2001234201 A | 8/2001 |
| JP | 2001293602 A | 10/2001 |
| JP | 2002029845 A | 1/2002 |
| JP | 3289285 B2 | 6/2002 |
| JP | 2004168558 A | 6/2004 |
| JP | 2004175626 A | 6/2004 |
| JP | 2004330314 A * | 11/2004 |
| JP | 2005239472 A | 9/2005 |
| JP | 2005298902 A | 10/2005 |
| JP | 2007126326 A | 5/2007 |
| JP | 2007126329 A | 5/2007 |
| JP | 2007153666 A | 6/2007 |
| RU | 1047105 A1 | 6/1993 |
| RU | 2060933 C1 | 5/1996 |
| RU | 2166425 C1 | 5/2001 |
| WO | 86/01433 A1 | 3/1986 |
| WO | 88/07409 A1 | 10/1988 |
| WO | 90/09361 A1 | 8/1990 |
| WO | 95/27121 A1 | 10/1995 |
| WO | 96/36465 A1 | 11/1996 |
| WO | 97/29884 A1 | 8/1997 |
| WO | 98/46344 A1 | 10/1998 |
| WO | 99/29412 A1 | 6/1999 |
| WO | 00/18702 A1 | 4/2000 |
| WO | 01/16249 A1 | 3/2001 |
| WO | 02/11876 A2 | 2/2002 |
| WO | 04/001238 A2 | 12/2003 |
| WO | 2005/068113 A1 | 7/2005 |
| WO | 2007/020518 A1 | 2/2007 |
| WO | 2008/053430 A1 | 5/2008 |
| WO | 2008/096314 A2 | 8/2008 |
| WO | 2008/135949 A2 | 11/2008 |
| WO | 2010/046860 A1 | 4/2010 |
| WO | 2010/098978 A1 | 9/2010 |
| ZA | 200110354 A | 7/2002 |

\* cited by examiner

POLYCRYSTALLINE DIAMOND

This application claims the benefit of U.S. Provisional Application No. 61/250,071, filed Oct. 9, 2009,, the disclosure of which is incorporated herein by reference in its entirety.

BACKGROUND

The invention relates to polycrystalline diamond (PCD) composite compacts comprising a PCD structure bonded to a substrate, method for making same, tools incorporating same and method for the making tools.

Polycrystalline diamond (PCD) is a super-hard, also called superabrasive material comprising a plurality of substantially inter-grown diamond grains, forming a skeletal mass defining interstices between the diamond grains. PCD is distinguished from composite materials and tool components comprising substantially non-inter-grown diamond grains dispersed within a supporting matrix. As used herein, PCD material comprises at least 80 volume percent, or even at least about 85, volume percent diamond and may be made by subjecting an aggregated mass of diamond grains in the presence of a sintering aid, such as cobalt, to an ultra-high pressure of greater than about 5, GPa, for example, and temperature of at least about 1,200 degrees centigrade, for example. The sintering aid, also known as solvent/catalyst material or catalyst material for diamond, may promote the inter-growth of diamond grains. PCD material may be sintered and integrally formed onto a substrate body comprising cobalt-cemented tungsten carbide, which may provide a source of cobalt for sintering the diamond grains, to form a PCD composite compact. A PCD structure thus joined to a substrate may be said to be "integrally bonded" to the substrate. Materials that do not promote substantial coherent intergrowth between the diamond grains may themselves form strong bonds with diamond grains, but are not suitable catalyst materials for sintering PCD materials.

PCD material is used in a wide variety of tools for cutting, machining, drilling or degrading hard or abrasive materials such as rock, metal, ceramics, composites and wood-containing materials. For example, PCD elements comprising PCD composite compacts are used as cutting elements on drill bits used for boring into the earth in the oil and gas drilling industry. PCD elements are also used for machining and milling metal-containing bodies, such as may be used in the auto manufacturing industry.

The composition of PCD material may be selected depending on the intended application and the nature of the body to be machined, cut, drilled or degraded. One aspect of the composition that may affect key properties and behaviour of PCD material is the mean size of the diamond grains comprised in the PCD material, which may influence certain mechanical and other properties and consequently the performance of the PCD in use and the ease with which a tool comprising the PCD material can be re-sharpened. PCD materials comprising diamond grains having a mean size of several microns may be particularly difficult to cut and grind.

U.S. Pat. No. 3,745,623, discloses the application of high pressure, high temperature technology to provide diamond tipped machine tools in which in place of utilizing a single diamond, the working diamond content is present in the form of a mass of diamond crystals bonded to each other.

U.S. Pat. No. 4,303,442, discloses a diamond sintered body and a method for producing the same, wherein a mixture comprising 50-95 volume percent of a diamond powder below micron, the remainder consisting of a powder below 1, micron of one or more than two kinds of carbides, nitrides, borides of IVa, Va and VIa group metals of the periodic table and solid solutions thereof, and further a powder of iron group metals, is interposed between a plurality of cemented carbide plates, and then subjected to hot press sintering at a high temperature and high pressure under which diamond is stable thereby enabling to obtain a diamond sintered body having high wear resistance.

Japan patent publication number 09-316587A discloses a high strength fine particle diamond sintered body, in which the grain size of the diamond particles is in the range of between 0.1, and 4, microns, and comprising a bonding material containing at least 1, iron group metal chosen from the group consisting of Fe, Co and Ni, and at least one of the metallic carbide, nitride or boride compounds which are chosen from the 4A, 5A and 6A periodic table groups and a solid solution or mixture of these.

PCT publication number WO/2008/053430, discloses a method for making PCD composite material, the method including introducing finely particulate tungsten carbide particles, having a preferred size of less than 1, micrometer.

European patent application publication number 0 976 444, discloses a PCD structure comprising a mass of diamond grains having a size in the range from 1, to 10, microns. A thin PCD layer sintered between two cemented carbide discs, each having a thickness of 3, mm and comprising 4, weight percent to 6, weight percent Co, is also disclosed.

International application publication number WO/2007/020518, discloses a polycrystalline diamond abrasive element comprising a fine grained polycrystalline diamond material and a second phase comprising catalyst/solvent for the diamond material, wherein the polycrystalline diamond material is characterised in that it has an average catalyst/solvent mean-free-path value of less than 0.60, micron, and a standard error for the catalyst/solvent mean-free-path that is less than 0.90, micron.

There is a need to provide PCD composite compacts, particularly but not exclusively comprising high strength grades of PCD material or very fine-grained PCD material, which are easier to cut and grind, and tool components comprising same.

SUMMARY OF EMBODIMENTS OF THE INVENTION

Embodiments of the invention provide a PCD composite compact comprising a PCD structure bonded at an interface to a substrate comprising cemented carbide material; the PCD structure comprising a mass of directly inter-bonded diamond grains having a mean size of at most about 4, microns, at most about 2, microns or at most about 1, micron, and the PCD structure comprising at least about 0.05, weight percent, at least about 0.1, weight percent, at least about 0.2, weight percent or at least about 0.5, weight percent refractory metal or carbide of a refractory metal selected from the group consisting of W, Ti, V, Cr, Zr, Nb, Mo, Hf and Ta; and at least the cemented carbide material proximate the interface having a content of metallic binder material of at most about 6, weight percent, at most about 5.5, weight percent or at most about 5, weight percent. The PCD structure may be integrally bonded to the substrate.

In some embodiments of the invention, the cemented carbide material or the PCD structure may contain at most about 2, weight percent, at most about 1 weight percent or even at most about 0.5, weight percent refractory metal or carbide of refractory metal. In some embodiments, the refractory metal may be selected from the group consisting of Ti, V, Cr, Zr, Nb, Mo, Hf and Ta. In some embodiments, the refractory metal may be at least one of V or Cr, and in some embodiments, the refractory metal carbide may be at least one of VC or $Cr_3C_2$. In some embodiments, the cemented carbide substrate or the PCD structure may contain about 0.1, weight percent to about 0.5, weight percent VC, or about 0.1, weight percent to about 0.5, weight percent $Cr_3C_2$, or a combined content of about 0.2, weight percent to about 1, weight percent of VC and $Cr_3C_2$.

In some embodiments of the invention, the PCD structure may contain sufficiently few abnormally large diamond grains, sufficiently sparsely dispersed therein such that when a cross-section through the PCD structure, the substrate and the interface is viewed, at most about 10,, at most about 7, at most about 5, or at most about 2, abnormally large diamond grains are evident at the cross-section along a length of at least about 10, mm of the interface. In one embodiment of the invention, the diamond grains may have a mean size of less than 2, microns. In some embodiments, the mean size of the diamond grains in the PCD structure may be at least about 0.05, micron or at least about 0.1, micron.

In some embodiments of the invention, the PCD structure may comprise more than 15, weight percent or at least about 17, weight percent catalyst material for diamond.

In one embodiment of the invention, the PCD structure may have transverse rupture strength of at least about 1,800, MPa, at least about 2,000, MPa or even at least about 2,200, MPa. The transverse rupture strength of the PCD structure as such is measured without the substrate (the substrate may be removed by grinding it away, leaving only an unsupported PCD structure).

In one embodiment of the invention, the number of abnormally large diamond grains at or proximate the interface is at most 2, per 10, mm of length along the interface. In one embodiment of the invention, there are substantially no abnormally large diamond grains along the interface between the PCD structure and the substrate.

Embodiments of the invention may provide a PCD composite compact comprising a PCD structure integrally bonded at an interface to a substrate comprising cemented carbide material; the PCD structure comprising a mass of coherently bonded (also referred to as directly inter-bonded) diamond grains having a mean size of at most about 4, microns, at most about 2 microns or even at most about 1, micron, and at least the cemented carbide material proximate the interface having a content of metallic binder material of at most about 6, weight percent, at most about 5.5, weight percent or at most about 5, weight percent of the cemented carbide material; in which the PCD structure includes at most about 10,, at most about 7,, at most about 5,, or at most about 2, abnormally large diamond grains within any area within at least a portion of the PCD structure, the area extending at least about 50, microns away from interface and a length of at least about 10, mm along the interface. In one embodiment of the invention, the diamond grains may have a mean size of less than 2, microns.

In some embodiments of the invention, the PCD structure may contain at most about 100,, at most about 50,, at most about 25, or at most about 5, abnormally large diamond grains within a volume of the PCD structure extending about 50 microns from an area of the interface, the area having magnitude of at least about 100, square millimeters.

In one embodiment of the invention, the PCD composite compact may be substantially free from abnormally large diamond grains proximate the interface between the PCD structure and the substrate.

Certain embodiments of the invention provide a PCD structure comprising a mass of directly inter-bonded diamond grains having a mean size of at most about 4, microns, at most about 2, microns or at most about 1, micron, in which the PCD structure contains sufficiently few abnormally large diamond grains, sufficiently sparsely dispersed therein such that when a cross-section through the PCD structure is viewed, at most about 10,, at most about 7,, at most about 5, or at most about 2, abnormally large diamond grains are evident at the cross-section along a length of at least about 10, mm of a surface or boundary of the PCD structure. In one embodiment of the invention, the PCD structure may be substantially free of abnormally large grains proximate a boundary or surface of the PCD structure, or throughout substantially the entire PCD structure. In one embodiment, the PCD structure may not be joined or bonded to a substrate.

Some embodiments of the invention provide a PCD composite compact comprising a PCD structure integrally bonded at an interface to a substrate comprising cemented carbide material; the PCD structure comprising a mass of directly inter-bonded diamond grains having a mean size of at most about 4 microns, at most about 2, microns or at most about 1, micron, and at least the cemented carbide material proximate the interface having a content of metallic binder material of at most about 6, weight percent, at most about 5.5, weight percent or at most about 5, weight percent; in which the PCD structure contains sufficiently few diamond grains having a size of at least about 10 microns or at least about 15, microns, sufficiently sparsely dispersed therein such that when a cross-section through the PCD structure, the substrate and the interface is viewed, at most about 10,, at most about 7,, at most about 5, or at most about 2, diamond grains having a size of at least about 10, microns or at least about 15, microns are evident at the cross-section along a length of at least about 10, mm of the interface.

Embodiments of the invention provide a PCD composite compact comprising a PCD structure bonded at an interface to a substrate comprising cemented carbide material; the PCD structure comprising a mass of directly inter-bonded diamond grains having a mean size of at most about 4, microns, at most about 2, microns or at most about 1, micron; and at least the cemented carbide material proximate the interface having a content of metallic binder material of at most about 6, weight percent, at most about 5.5, weight percent or at most about 5, weight percent; in which the PCD structure contains sufficiently few abnormally large diamond grains, sufficiently sparsely dispersed therein such that when a cross-section through the PCD structure, the substrate and the interface is viewed, at most about 10,, at most about 7, at most about 5, or at most about 2, abnormally large diamond grains are evident at the cross-section along a length of at least about 10, mm of the interface. The PCD structure may be integrally bonded to the substrate.

A method for making an embodiment of a PCD composite compact according to the invention includes disposing an aggregated mass of diamond grains against a surface of a substrate body to form an unbonded assembly; in which the substrate body comprises cemented carbide material having a content of catalyst material for diamond of most about 10, weight percent, at most about 8, weight percent, or at most about 7, weight percent of the cemented carbide material; and in which the diamond grains have a mean size of at most about 4, microns, at most about 2, microns or even at most about 1, micron; introducing into the aggregated mass catalyst material for diamond and refractory metal or carbide of a refractory metal selected from the group consisting of Ti, V, Cr, Zr, Nb, Mo, Hf and Ta; and subjecting the unbonded assembly to a pressure and temperature at which diamond is more thermodynamically stable than graphite and forming a PCD composite compact.

In some versions of the method, the substrate may comprise at least about 0.05, weight percent, at least about 0.1, weight percent, at least about 0.2 weight percent or even at least about 0.5, weight percent of refractory metal or carbide of a refractory metal selected from the group consisting of Ti, V, Cr, Zr, Nb, Mo, Hf and Ta. In some versions, the substrate may contain at most about 2, weight percent of carbide of refractory metal or carbide of refractory metal.

In one embodiment of the invention, the method may include introducing at least 2, weight percent or at least about 3, weight percent of a catalyst material for diamond into the aggregated mass to form the unbonded assembly, the weight percent being of the combined mass of the diamond grains and the catalyst material. In one version, the method may include introducing at most about 8, weight percent or at most about 6, weight percent of a catalyst material for diamond into the aggregated mass to form the unbonded assembly.

In some versions of the method, the cemented carbide material may comprise particles of metal carbide having a mean size of at least about 0.1, micron or at least about 1, micron, and in some versions of the method, the cemented carbide material may comprise particles of metal carbide having a mean size of at most about 4, microns, at most about 2, microns or even at most about 1 micron. In one version of the method, the metallic binder material may comprise cobalt and the metal carbide may be tungsten carbide.

An aspect of the invention provides a tool component comprising a PCD composite compact according to an embodiment of the invention, the tool component being for a tool for cutting, milling, drilling, earth boring, rock drilling or other abrasive and chip-forming applications. In one embodiment of the invention, the tool may be a machine tool for machining a body comprising metal, ceramic material or a composite material. In one embodiment of the invention, the tool component is for machining a body comprising an alloy material including aluminium and silicon.

In some embodiments of the invention, the tool component may be suitable for a machine tool or for a drill bit for boring into the earth. In one embodiment, the tool may be a rotary shear-cutter drill bit for use in the oil and gas drilling industry. In some embodiments, the tool component may be a tip for a rotary machine tool, an insert for a drill bit for boring into the earth or an insert for an indexable machine tool.

In one embodiment, a tool component may be substantially free of abnormally large diamond grains proximate the interface.

A method of making an embodiment of a tool component according to the invention includes providing a PCD composite compact according to the invention and cutting the PCD composite compact through the PCD structure, the substrate and the interface by electrical, laser or mechanical means to form a semi-finished element, and processing the semi-finished element to form a tool component. In some versions, the processing may involve grinding, lapping and or polishing the semi-finished element to form a tool component such as a tip for a rotary machine tool, an insert for a drill bit for boring into the earth or an insert for an indexable machine tool.

DRAWING CAPTIONS

Non-limiting embodiments will now be described with reference to the accompanying drawings of which:

The same reference numbers refer to the same features in all the figures.

DETAILED DESCRIPTION OF EMBODIMENTS OF THE INVENTION

As used herein, "polycrystalline diamond" (PCD) material comprises a mass of diamond grains, a substantial portion of which are directly inter-bonded with each other and in which the content of diamond is at least 80, volume percent of the material. In one embodiment of PCD material, interstices between the diamond grains may be at least partly filled with a binder material comprising a catalyst for diamond. As used herein, "interstices" or "interstitial regions" are regions between the diamond grains of PCD material. In embodiments of PCD material, interstices or interstitial regions may be substantially or partially filled with a material other than diamond, or they may be substantially empty. Embodiments of PCD material may comprise at least a region from which catalyst material has been removed from the interstices, leaving interstitial voids between the diamond grains. As used herein, a "PCD structure" comprises PCD material.

Figure 1:
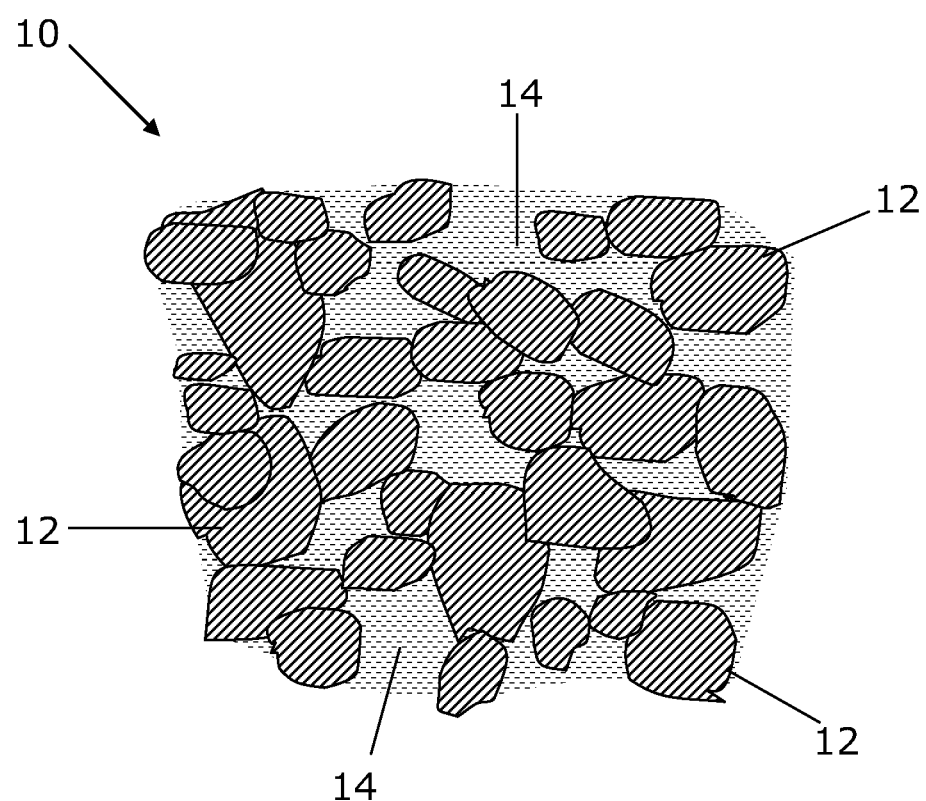
FIG. 1 shows a schematic drawing of the microstructure of an embodiment of PCD material.

With reference to FIG. 1, PCD material 10 comprises a mass of directly inter-bonded grains 12 of diamond and interstices 14 between the diamond grains 12, which may be at least partly filled with filler or binder material.

As used herein, the D(x) value of the size distribution of a plurality of grains refers to the size below which x % of the grain volume occurs. Unless otherwise stated, as used herein in relation to a given plurality of grains, an abnormally large grain is a grain having a dimension of at least double the D(99.99) value of the size distribution of the plurality of grains. Where the mean diamond grain size is less than about 2, microns, grains exceeding about 10, microns in their largest dimension are regarded herein as abnormally large.

As used herein, references to a "length along the interface" between a PCD structure and a substrate of a PCD composite compact, for example a length of 10, mm, do not imply that there exists a contiguous interface having that length, and includes the possibility that the PCD composite compact may have dimensions substantially smaller than the length. Reference to the length includes reference to a plurality of lengths which, when added together, have a combined length of the length referred to. The plurality of lengths may be lengths along the interface viewed from different sides of the PCD composite compact or viewed on different cross sections through the PCD composite compact.

A multi-modal size distribution of a mass of grains is understood to mean that the grains have a size distribution with more than one peak, each peak corresponding to a respective "mode". Multimodal polycrystalline bodies may be made by providing more than one source of a plurality of grains, each source comprising grains having a substantially different average size, and blending together the grains or particles from the sources. In one embodiment of the invention, the PCD structure may comprise diamond grains having a multimodal distribution.

As used herein in relation to grains or particles and unless otherwise stated or implied, the term "size" refers to the equivalent circle diameter (ECD), which is a measure of the size of a grain or particle in terms of the diameter of a circle having the same area as the grain viewed from the side or in cross section.

The size distribution and mean size of grains within a polycrystalline structure, such as diamond grains within a PCD structure, is measured by polishing a section surface of the PCD structure, obtaining a scanning electron microscope (SEM) image of the surface and using an image analysis means to convert the exposed cross-sectional areas of the grains into a distribution of equivalent circle diameters. In measuring the size distribution of grains within a PCD structure, several images of different parts of a surface or section are used to enhance the reliability and accuracy of the statistics. The number of images used may be at least about 9, or even up to about 36. For example, 16, images may be taken of different areas on a surface of a PCD structure and statistical analyses carried out on each image as well as across the images. The resolution of the images needs to be sufficiently high for the inter-grain and inter-phase boundaries to be clearly made out. Each image should contain at least about 30, diamond grains, although more grains may permit more reliable and accurate statistical image analysis. The size distribution thus obtained may be statistically analysed in terms of D-values, for example.

In one embodiment of the invention, a PCD composite compact may comprise a PCD structure integrally bonded at an interface to a substrate comprising cemented carbide material; the PCD structure comprising a mass of directly inter-bonded diamond grains having a mean size of at most about 2, microns, and the PCD structure comprising at least about 0.05, weight percent of a refractory metal or carbide of refractory metal selected from the group consisting of W, Ti, V, Cr, Zr, Nb, Mo, Hf and Ta; and the cemented carbide material having a content of metallic binder material of at most about 6, weight percent. The PCD structure may contain sufficiently few abnormally large diamond grains, sufficiently sparsely dispersed therein such that when a cross-section through the PCD structure, the substrate and the interface is viewed, at most about 7, abnormally large diamond grains are evident at the cross-section along a length of at least about 10, mm of the interface.

In some embodiments of the invention, the PCD structure may comprise directly inter bonded diamond grains having a mean grain size from about 0.1 micron to about 2.0, microns, in which the PCD structure comprises PCD material having an average interstitial mean-free-path value of less than 0.60 micron, and a standard error of the catalyst mean-free-path that is less than 0.90, or less than 0.85. The interstitial mean-free-path is the mean-free-path value of the distribution of distances between proximate diamond grains separated by interstitial regions, which may be at least partly filled with catalyst material for diamond. The interstitial mean-free-path is determined as the thickness of the interstices substantially filled with binder material, as described in European patent application publication number 0 974 566, and international patent application publication number WO/2007/020518. The standard error of the catalyst mean-free-path is determined by dividing the standard deviation value of the distribution of catalyst mean-free-path values by the mean-free-path value. Lower standard error values may indicate higher homogeneity of the PCD material. One method of measuring the distribution of catalyst mean-free-paths is to photograph a polished surface of the PCD structure by means of a microscope (an SEM, for example) and drawing an arbitrary straight line on the photographs. The distance between diamond grains is measured at 20, or more places on the line to obtain the mean value of the measurements. The standard deviation of these values may be calculated from these values. Image analysis methods may be used for carrying out this process.

In one embodiment of the invention, the PCD structure may comprise PCD material comprising substantially inter-bonded diamond grains having a mean size in the range from about 0.8, microns to about 1.8, microns, the interstitial regions between the diamond grains having a mean size in the range from about 0.1, micron to about 1, micron. The diamond content of the PCD material may be in the rage from about 83, percent to about 90, percent of the area of a section through the PCD material. The PCD structure may have transverse rupture strength in the range from about 2,000, MPa to about 2,200 MPa, or higher.

In some embodiments of the invention, the PCD structure may comprise a first volume and a second volume, the mean size of the diamond grains of the first volume being greater than that of the diamond grains in the second volume; the first volume being proximate the substrate and the second volume being remote from the substrate. In one embodiment, the first and second volumes may have substantially wafer or layered forms, and in one embodiment, the first volume may have a thickness of at least about 0.2, mm. In one embodiment, the second volume may define a working surface. In some embodiments, the mean size of the diamond grains in the first volume of the PCD structure may be greater than 2, microns and the mean size of the diamond grains in the second volume of the PCD structure may be in the range from 0.01, micron to 1.5, microns or in the range from 0.01, micron to 1 micron.

As used herein, thickness of the PCD structure or the substrate, or some part of the PCD structure or the substrate is the thickness measured substantially perpendicularly to the interface. In some embodiments of the invention, the PCD structure may have a generally wafer, disc or disc-like shape, or have the general form of a layer. In some embodiments of the invention, the PCD structure may have a thickness of at least about 0.2, mm, at least 0.3, mm, at least about 0.5, mm, at least about 0.7, mm, at least about 1, mm, at least about 1.3, mm or at least about 2, mm. In one embodiment, the PCD structure may have a thickness in the range from about 2, mm to about 3, mm.

In some embodiments, the PCD structure may comprise a first region and a second region, the first region being adjacent the interface and the second region being remote from the interface; wherein the mean content of the refractory metal in the first region is greater than that in the second region. In one embodiment the content of the refractory metal in the second region may be at most about 0.5, weight percent.

In some embodiments of the invention, the substrate may comprise cemented carbide material within a volume extending a depth of at least about 1, mm from the interface and having a content of metallic binder material of at most about 6, weight percent, at most about 5.5, weight percent or at most about 5 weight percent of the cemented carbide material. In one embodiment of the invention, the content of the metallic binder material in the substrate may increase with depth into the substrate from the interface.

In some embodiments of the invention, the cemented carbide material may comprise particles of metal carbide having a mean size of at least about 0.1 micron or at least about 1, micron. In some embodiments, the cemented carbide material may comprise particles of metal carbide having a mean size of at most about 4, microns, at most about 2, microns or at most about 1 micron. While wishing not to be bound by a particular theory, the use of a substrate comprising relatively small carbide particles (at most about 4 microns in mean size, for example) may generally help reduce the accumulation or "pooling" of binder material within the PCD structure adjacent the interface between the PCD structure. In one embodiment of the invention, the metallic binder material may comprise a catalyst material for diamond, such as cobalt, iron, nickel or manganese or an alloy containing any of these materials. In some embodiments, the metallic binder content may be at least about 3, weight percent or at least about 5, weight percent of the cemented carbide material.

In some embodiments of the invention, the substrate may have the general shape of a wafer, disc or post, and may be generally cylindrical in shape. In some embodiments of the invention, the substrate may have an axial thickness of at least about 1, mm, at least about 2.5, mm, at least about 3, mm, or least about 5, mm or even at least about 10, mm. In one embodiment, the substrate may have a thickness of at least 2, cm.

In one embodiment of the invention, the PCD structure may be joined to the substrate on one side, the opposite side of the PCD structure not being bonded to a substrate. In other words, the PCD structure may not be disposed or "sandwiched" between a pair of substrates.

An embodiment of the invention may be made using the following method. An aggregated mass of diamond grains having a mean size of at most about 2 microns may be combined with cobalt-containing powder, the amount of which in one non-limiting example embodiment may be less than about 5, weight percent of the combined weight of the diamond and the cobalt. The aggregated mass may be disposed as a layer on a surface of a substrate body comprising cemented carbide material, in which the content of metallic binder material may be at most 10, weight percent. The cemented carbide material may comprise particles of metal carbide having a mean size of at least about 0.1, micron and at most about 4, microns, and may contain about 0.1, weight percent to about 0.5, weight percent VC and about 0.1, weight percent to about 0.5, weight percent $Cr_3C_2$. The metallic binder material may comprise cobalt and the metal carbide particles may be tungsten carbide particles. The aggregated mass and the substrate thus combined may be encapsulated within jacket or canister comprising metal or ceramic material, to form an unbonded assembly. The unbonded assembly may then be subjected to an ultra-high pressure of at least about 5.5, GPa and a temperature of at least about 1,300, degrees centigrade to form a sintered PCD composite compact comprising a PCD structure formed of directly inter-bonded diamond grains integrally joined to the substrate at an interface. In some embodiments, the ultra-high pressure may be at least about 6, GPa, at least about 7, GPa or even at least about 8, GPa.

In some versions of the method, the aggregated mass may be disposed against the surface of the substrate generally in the form of a layer having a thickness of least about 0.6, mm, at least about 1, mm, at least about 1.5, mm or even at least about 2, mm. The thickness of the mass of diamond grains may reduce significantly when the grains are sintered at an ultra-high pressure.

Metallic binder material within the substrate may be molten at the ultra-high pressure and high temperature condition used to sinter the PCD and some of it may migrate from the substrate into the aggregated mass of diamond grains. In embodiments in which the metallic binder material is a catalyst material for diamond, such as cobalt, it may promote the direct inter-growth of the diamond grains. As a result of the migration of the metallic binder from the substrate, the content of the metallic binder material in the substrate after the sintering process at the ultra-high pressure may be substantially less than it was before the process. For this reason, the content of the metallic binder in the substrate body before sintering is to be selected to take this into account. In some embodiments, the mean reduction in the binder content of the cemented carbide substrate within a region extending from the interface to a depth of at least about 1, mm, or throughout the whole substrate in some embodiments, may be in the range from about 40, percent to about 50, percent. In some embodiments, the method may include providing a substrate comprising cemented carbide within at least a region adjacent a surface, or substantially throughout the whole substrate, having a mean binder content at least about 40, percent, at least about 45, percent or even at least about 50 percent higher than the binder content in at least the corresponding region of the embodiment of the PCD composite compact thus made.

In one embodiment, the composition of the substrate may vary with position and a region of the substrate substantially remote from the surface against which the agglomerated mass of diamond grains is disposed may comprise cemented carbide material in which the content metallic binder material may be greater than 10, weight percent.

Figure 2:
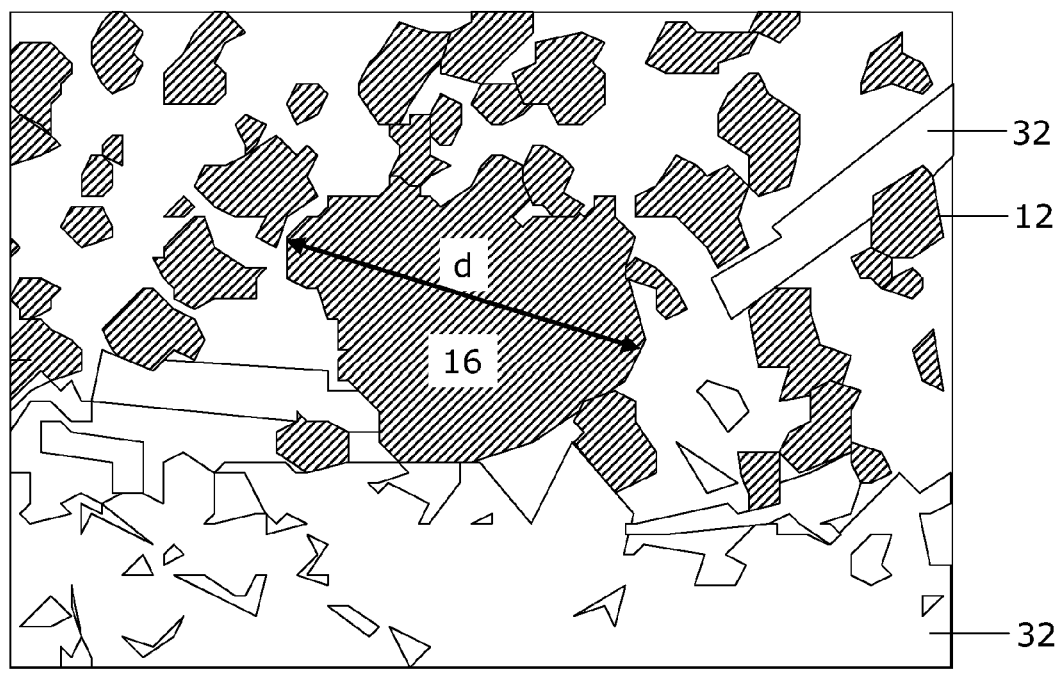
FIG. 2 shows a schematic drawing of a scanning electron micrograph of a polished cross section of a PCD composite compact element according to the prior art.

With reference to FIG. 2, a prior art PCD composite compact may comprise a PCD structure comprising diamond grains 12 having a mean size of at most about 10, microns, and abnormally large diamond grains 16 proximate the interface between the PCD structure and a substrate comprising tungsten carbide grains 32. The largest size dimension of the abnormally large diamond grain 16 shown in the image is indicated as d. While wishing not to be bound by a particular theory, abnormally large diamond grains may arise from exaggerated grain growth during the process of sintering the PCD.

The minimum size regarded as abnormally large depends of the mean grain size. Where the mean diamond grain size is less than about 2, microns, grains exceeding about 10, microns in their largest dimension d may be regarded as abnormally large.

Figure 3:
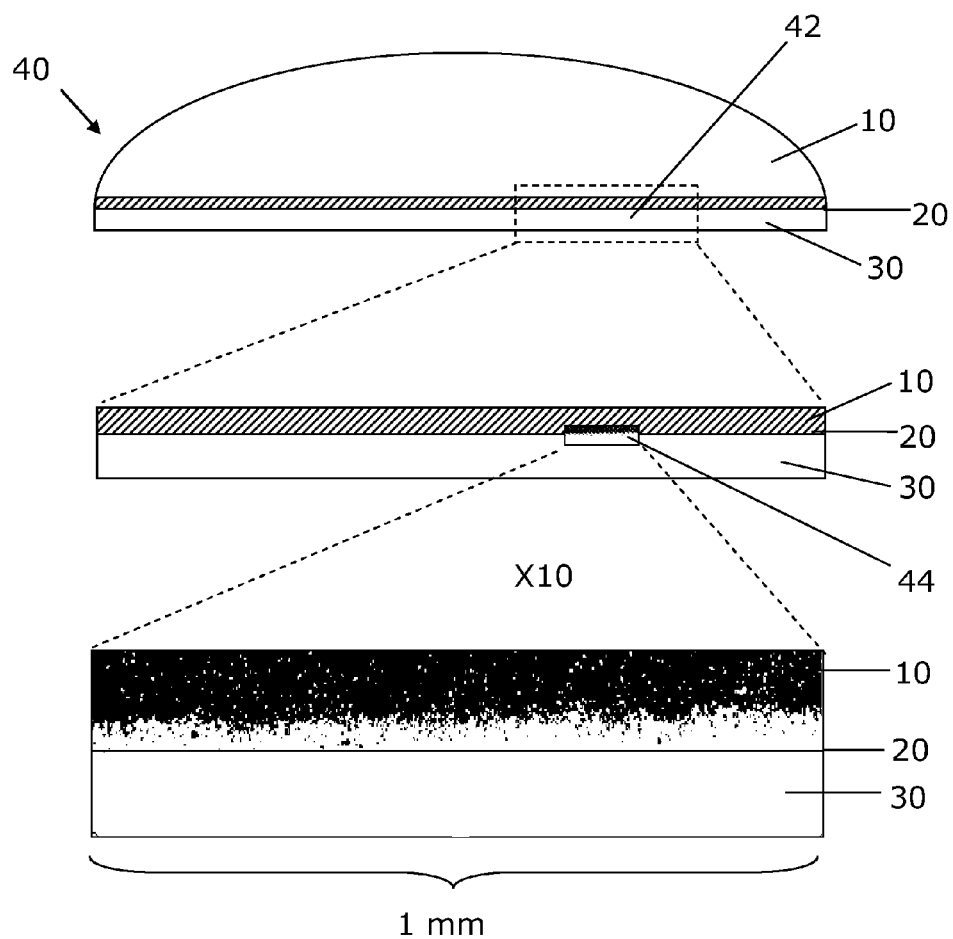
FIG. 3 shows a schematic cross section view through an embodiment of a PCD composite compact disc, as well as two magnified views of part of the cross section surface.

With reference to FIG. 3, an embodiment of a PCD composite compact 40 comprising a PCD structure 10 integrally bonded at an interface 20 to a substrate 30 comprising cemented carbide material; in which the PCD structure 10 contains sufficiently few abnormally large diamond grains, sufficiently sparsely dispersed therein such that when a cross-section 42 through the PCD structure 10, the substrate 30 and the interface 20 is viewed, at most about 7, abnormally large diamond grains (not shown) are evident at the cross-section 42 along at least about 10, mm of the interface 20. As a non-limiting example, the cross section 42 may be exposed for viewing by cutting a section of the PCD composite compact by means of a wire EDM. The cross section may be polished for in preparation for viewing by a microscope, such as a scanning electron microscope (SEM) and a series of micrographic images 44 may be taken along the interface 20. Each of the images may be analysed by means of image analysis software to measure the size distribution of the diamond grains and to count the number of abnormally large grain present, if any. Abnormally large diamond grains may be plainly evident in the images even without the need for image analysis. These images may be placed along side each other to produce a view along at least about 10, mm of the interface and the combined number of abnormally large diamond grains present, if any, counted.

It may occur that the process of cutting a cross section through a PCD composite compact may result in the destruction or removal of abnormally large grains, leaving a hole in the PCD structure, in which case it is the size of the hole that must be measured and equated to the size of the grain that had occupied it.

The PCD structure may contain carbide particles, particularly within a region proximate the interface with the substrate. The position of the interface may be determined by identifying the diamond grain or grains evident on a microscopic image, which grain or grains originate from the aggregated mass of diamond grains disposed against a surface of the substrate prior to sintering, and which is or are furthest away from the bulk of the PCD structure, and requiring these grains to be on the PCD structure side of the interface. In other words, the position of the interface is so as just to exclude such grain or grains from the substrate. In embodiments where the surface of the substrate against which the aggregated mass was disposed is substantially planar, the interface between the PCD structure and the substrate will be substantially planar. In embodiments where the surface is non-planar, the interface will be similarly non-planar.

If a specimen of a PCD composite compact is too small for a cross section having a length of 10, mm to be obtained, the specimen may be cut into several pieces to generate several cross sections. Each of the cross sections may be prepared and viewed by means of a microscope, and micrographic images of each may be obtained. Alternatively or additionally, if the interface is exposed at a side of a PCD composite compact then micrographic images along the interface thus exposed can be used.

As used herein, a "machine tool" is a powered mechanical device, which may be used to manufacture components comprising materials such as metal, composite materials, wood or polymers by machining. As used herein, "machining" is the selective removal of material from a body, called a workpiece. As used herein, a "rotary machine tool" is a machine tool comprising a cutter element, for example a drill bit, which rotates about its own axis in use. As used herein, an "indexable cutter insert" is a cutter insert comprising one or more cutting edges and that is configured to be mountable onto a tool body in more than one discrete orientation suitable for using each of the respective cutting edges to cut a workpiece. Once a cutting edge is excessively worn, it may be mounted onto the tool body in a different orientation (i.e. "indexed") so that another edge may be used for further cutting.

Some embodiments of tool components according to the invention may be inserts for machine tools for machining bodies comprising alloys of silicon and aluminium. Embodiments of machine tools according to the invention may be used for rough or finish machining of bodies comprising metal, particularly bodies comprising hard or high strength alloy material, such as aluminium-silicon alloy material. For example, machine tools comprising embodiments of PCD composite compacts according to the invention may be used to machine engine blocks, gear box housings and alloy wheels in the automotive industry, or certain high performance components used in the aerospace industry. Machine tools comprising embodiments of the invention may have enhanced reliability in performance, and may have enhanced uniformity of wear rates in use.

In one embodiment of the invention, an indexable machine tool component may be made by providing an embodiment of a PCD composite compact according to the invention in the form of a disc, comprising a layer of PCD integrally joined to a cobalt-cemented tungsten carbide substrate, and cutting triangular shaped elements from the disc. The cutting may be effected by means of a wire EDM apparatus or a laser beam. The elements may then be brazed to the tips of a cemented carbide carrier body to form a semi-finished assembly, which may then be finished by processing by precision grinding to form cutting edges onto the PCD structures. The grinding may be effected by means of a vitrified or resin bonded diamond grinding wheel. Electro-discharge grinding may be used to finish tools having a relatively complex shape or which are rotating tools, such as routers.

One advantageous application for embodiments of machine tool inserts according to the invention may be in machining operations involving severe repeated interruption of the cutting action while requiring an excellent surface finish, such as the turning of aluminium-silicon alloy wheels for automobiles.

This mode of machining may be referred to as "interrupted machining", in which the machine tool is repeatedly driven into and released from a workpiece during the machining cycle. This may arise due to the complex shape of the workpiece, for example. Interrupted machining causes the machine tool to experience repeated impacts at high frequency and with large force, and it is important that the tool has sufficiently high impact resistance and maintain a sharp cutting edge.

Rotary cutting tools, such as twist drills, having working tips comprising embodiments of PCD composite compacts according to the invention, in which the included cutting angle is relatively small, for example about 55 degrees, may have the advantage of extended working life. This may arise from enhanced strength of the PCD composite compact.

Figure 4A:
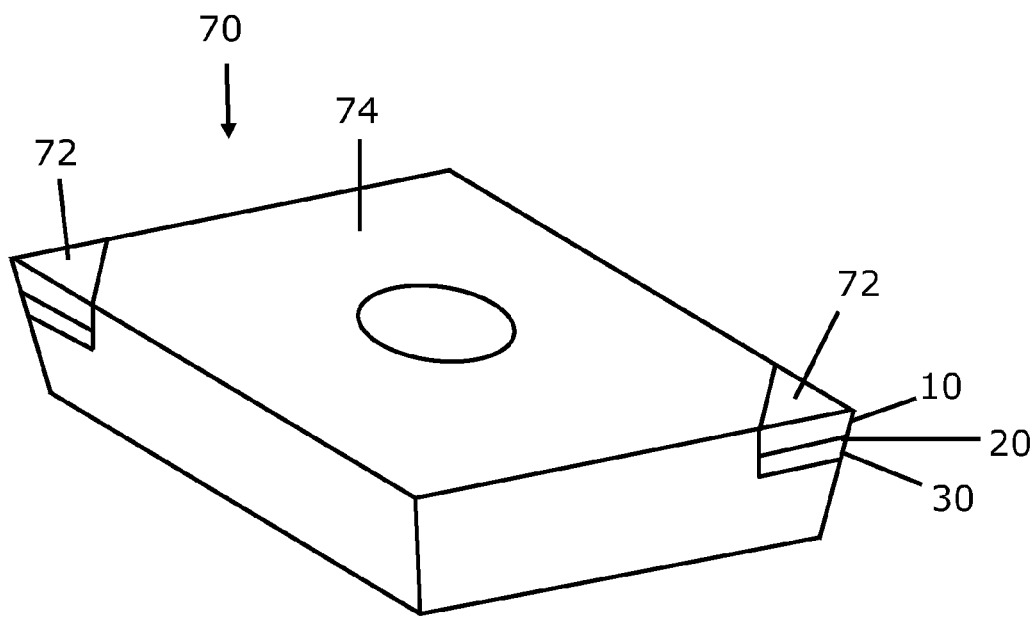
FIG. 4A shows a schematic perspective view of an indexable insert for a machine tool.
Figure 4B:
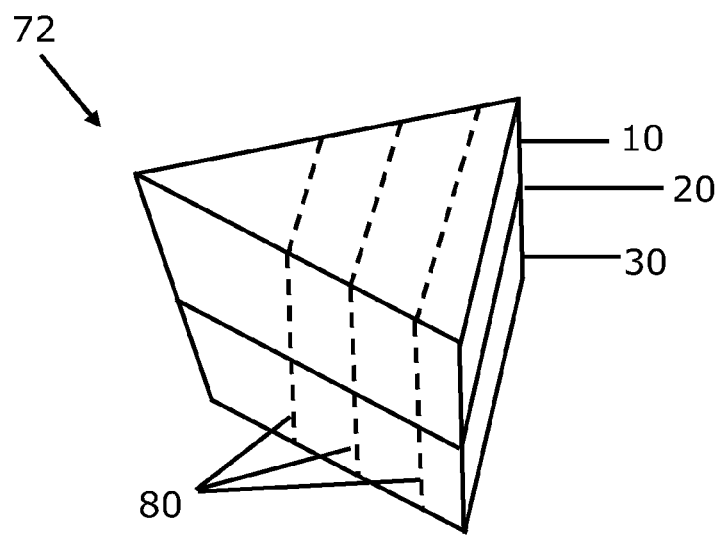
FIG. 4B shows a schematic perspective view of a tip for the indexable insert shown in FIG. 4A.

With reference to FIG. 4A, an embodiment of an insert 70 for a machine tool (not shown) comprises two cutting tips 72 joined to a tool carrier body 74, each cutting tip being a PCD composite compact comprising a respective PCD structure 10 integrally bonded at respective interface 20 to respective substrate 30. The maximum dimension of the cutting tips may be at most a few millimeters, for example at most about 5, mm. With reference to FIG. 4B, the number of abnormally large diamond grains along a length of about 10 mm of the interface 20 may be measured by cross sectioning a cutting tip 72 into a plurality of segments along cross section surfaces 80 to provide a plurality of lengths along the interface 20 having a combined length of at least about 10, mm, and counting the number of abnormally large diamond grains along the interface of each respective cross section surface 80.

Figure 5:
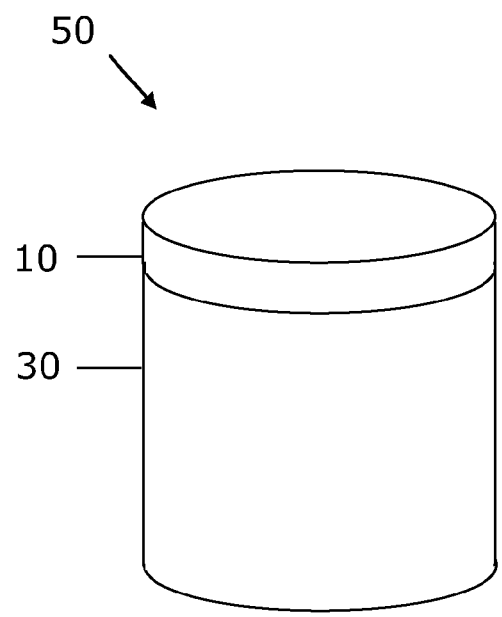
FIG. 5 shows a schematic perspective view of a PCD composite compact element for use as an insert for a shear cutting drill bit for boring into the earth.
Figure 6:
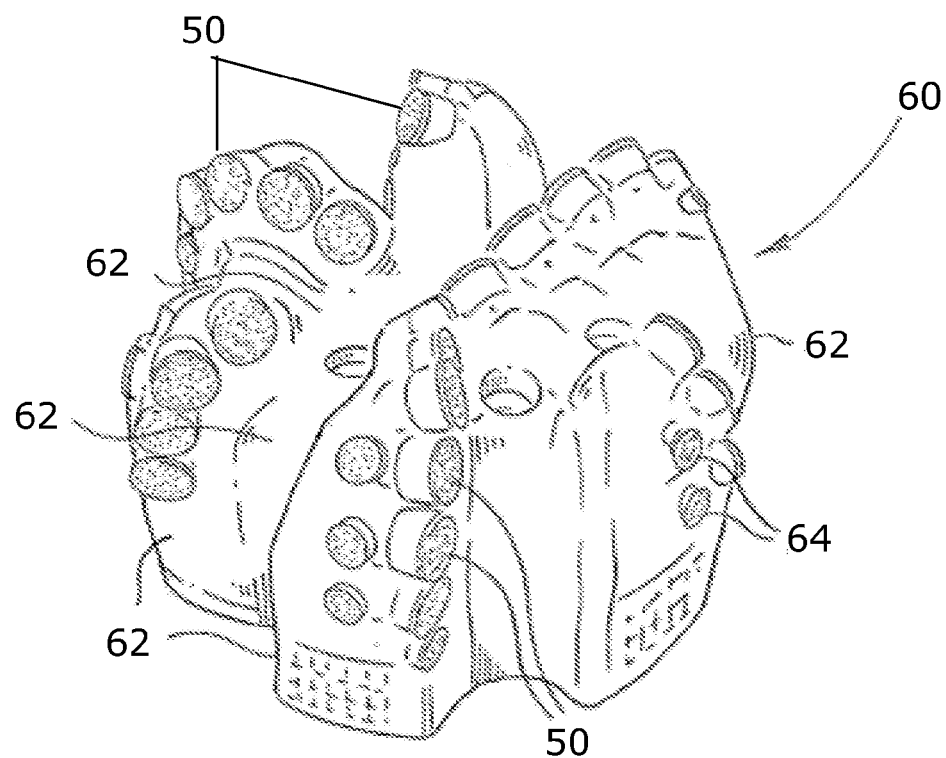
FIG. 6 shows a schematic perspective view of an embodiment of a drill bit for a drilling into rock.

With reference to FIG. 5, an embodiment of a PCD tool component 50 for a drill bit for boring into the earth may comprise a PCD structure 10 bonded to a substrate 30 formed of cemented carbide material. With reference to FIG. 6, an embodiment of a drill bit 60 for drilling into rock (not shown), comprising embodiments of PCD composite compact cutter elements 50 joined onto a drill bit body 62. The drill bit 60 may additionally comprise PCD composite compact elements 64 for purposes other than cutting rock, such as for protection against wear, for example.

Certain embodiments of the invention may have the advantage of providing PCD composite compacts comprising strong, very fine-grained PCD structures that are easier to cut by means of electro-discharge machining (EDM) and or that are easier to grind, as may be required to form the compact into a tool or a component for a tool. This may have the effect of reducing the manufacturing costs of the tools or components.

While wishing not to be bound by a particular theory, the reduction or substantial elimination of abnormally large diamond grains may have the advantage of making it easier to cut certain embodiments of PCD composite compacts by means of electro-discharge machining (EDM). This method of cutting involves using an electrically conductive wire to cut a structure by establishing electrical discharge between the wire and the structure.

Generally, the EDM cutting parameters may be optimised for a given material to be cut. Where the material is PCD material, particularly PCD material comprising very small diamond grains, the presence of abnormally large diamond grains may deleteriously affect the EDM cutting process and may even result in breakage of the EDM wire, which may substantially increase the costs of producing tools from the PCD structure. In addition, abnormally large grains may become detached from the PCD structure or even destroyed on encounter with the wire of other tool, leaving a hole (sometimes referred to as a "pin-hole") that may seriously reduce the commercial usefulness of the compact.

While wishing not to be bound by a particular theory, reduction or substantial elimination of abnormally large diamond grains may have the advantage of enhancing the fracture resistance or strength of certain embodiments of PCD composite compacts. The advantage may be particularly evident in embodiments comprising PCD structures comprising very small diamond grains, and the smaller the diamond grains, the greater may be the advantage, in general. For similar reasons, the advantage may be particularly evident in certain embodiments comprising particularly strong PCD material, and the higher the strength of the PCD material, the greater may be the advantage, in general.

In certain embodiments, if the PCD structure comprises diamond grains having a mean size substantially greater than about 4, microns, the strength of the PCD structure may be substantially reduced and a tool component comprising the PCD structure may be less suitable for machining bodies comprising hard or abrasive materials. In certain applications of embodiments of PCD composite compacts according to the invention, it may be preferable for the mean size of the diamond grains to be less than about 2, microns. In certain embodiments, if the content of metallic binder material in the substrate of the PCD composite compact is substantially greater than about 6, weight percent and the content of refractory metal or carbide of refractory metal in the PCD structure is less than about 0.05, weight percent of the PCD material, it may be difficult to cut or grind the PCD composite compact, particularly by means of an EDM apparatus, and the cost of manufacturing tool components may substantially increase. If the metallic binder content of the substrate is substantially less than about 3, weight percent, the substrate may be too brittle for certain cutting, drilling or machining applications. If the content of refractory metal or carbide of refractory metal in the PCD structure is too high, certain properties of the PCD structure such as the strength or toughness may be deleteriously affected. In some embodiments, a relatively high content of electrically conductive catalyst metal within the PCD may facilitate the cutting or grinding the PCD structure by means of electro-discharge methods, such as wire EDM.

Embodiments of the invention are described in more detail with reference to the examples below, which are not intended to limit the invention and which are summarised in the table below.

| Example | Mean WC grain size, microns | Approx. mean weight % Co in substrate | Weight % V in PCD | Weight % $Cr_3C_2$ in PCD | No. of abnormally large diamond grains per 10 mm |
|---|---|---|---|---|---|
| 1 (a) | 1.5 to 2 | 4 | 0.15 | 0 | 0 |
| 1 (b) | 0.8 | 5 | 0.3 | 0.2 | 0 |
| 1 (Reference) | 1.5 to 2 | 7 | 0 | 0 | 17 |
| 2 (a) | 1.5 to 1 | 3 | 0.15 | 0 | 0 |
| 2 (b) | 0.8 | 3 | 0.3 | 0.2 | 0 |
| 2 (Reference) | 1.5 to 2 | 7 | 0 | 0 | 95 |
| 3 (Reference) | 0.8 | 8 | 0.4 | 0.5 | 9 |

EXAMPLE 1

Three PCD composite compacts were sintered onto respective substrates each having a different composition. Each of the PCD compacts was substantially disc-shaped and comprised a PCD layer having a thickness of about 0.7, mm sintered onto a respective cobalt cemented tungsten carbide substrate having a thickness of about 2.4, mm after sintering. One of the three PCD compacts was a reference sample made for the purpose of comparison.

The PCD compacts were sintered in an ultra-high pressure furnace (also referred to an ultra-high pressure press or apparatus), in which respective unbonded assemblies were subjected to an ultra-high pressure of at least about 5.5, GPa and a temperature of at least about 1,300, degrees centigrade. Each unbonded assembly comprised an aggregated mass of diamond grains disposed upon the respective substrate body, which had a thickness of about 3, mm and a diameter of about 50, mm prior to the ultra-high pressure treatment, encapsulated within a metal canister. In all cases, the aggregated mass comprised diamond grains having a mean size in the range from about 0.75, microns to about 1.5, microns, and a D(99.99) size of about 4.5, microns plus-minus about 0.5, microns, and about 4.8, weight percent of cobalt dispersed among the diamond grains.

After sintering in the ultra-high pressure furnace, each of the PCD compacts was cut to expose a pair of substantially longitudinal cross sections through the PCD layer, the substrate and the interface between them. In each case, one of the exposed cross section surfaces was polished and examined by means of an electron microscope. In particular, a respective region of each PCD structure adjacent the interface and extending a depth of about 50 microns from the interface and having a length of about 10, mm along the interface was examined for the presence of abnormally large diamond grains. The region was selected to be remote from both the outer perimeter of the PCD compact and the centre of the compact in order to be as representative of the specimen as possible. Since the mean size of the diamond grains was less than 2, microns, a diamond grain having a dimension of at least about 10 microns is regarded as abnormally large.

Each of the three PCD composite compacts and their respective unbonded assemblies is described below.

EXAMPLE 1(a)

Prior to sintering the PCD at the ultra-high pressure, the substrate body comprised about 92, weight percent WC grains having a mean size in the range from about 1.5, microns to about 2, microns, about 8, weight percent Co and about 0.15, weight percent vanadium carbide (VC). No abnormally large grains were evident within the region examined. The mean content of Co within the substrate after sintering the PCD was about 4, weight percent and the mean Co content within the PCD structure was in the range from about 16 weight percent to about 18, weight percent. The content of VC in the PCD structure was at least about 0.15, weight percent.

EXAMPLE 1(b)

Prior to sintering the PCD at the ultra-high pressure, the substrate comprised about 90, weight percent WC grains having a mean size of about 0.8, microns, about 10, weight percent Co and about 0.3, weight percent vanadium carbide (VC), about 0.2, weight percent $Cr_3C_2$. No abnormally large grains were evident within the region examined. The mean content of Co within the substrate after sintering the PCD was about 5.2, weight percent and the mean Co content within the PCD structure was in the range from about 16, weight percent to about 18, weight percent. The content of VC in the PCD structure was at least about 0.3, weight percent and the content of $Cr_3C_2$, in the PCD structure was at least about 0.2, weight percent.

Reference Specimen

Prior to sintering the PCD at the ultra-high pressure, the substrate comprised about 87, weight percent WC grains having a mean size in the range from about 1.5, microns to about 2, microns and about 13, weight percent Co. Seventeen abnormally large grains were evident within the region examined, which translates to about 2, to 3, per mm. The mean content of Co within the substrate after sintering the PCD was about 6.8, weight percent.

EXAMPLE 2

Three PCD composite compacts were sintered onto respective substrates each having a different composition. The PCD had substantially the same major physical characteristics and were made the same way as described in Example 1. Each of the three PCD composite compacts and their respective unbonded assemblies is described below.

EXAMPLE 2(a)

Prior to sintering the PCD at the ultra-high pressure, the substrate comprised about 94, weight percent WC grains having a mean size in the range from about 1.5, microns to about 1, micron, about 6, weight percent Co and about 0.15, weight percent vanadium carbide (VC). No abnormally large grains were evident within the region examined. The mean content of Co within the substrate after sintering the PCD was about 3.2, weight percent and the mean Co content within the PCD structure was in the range from about 16, weight percent to about 18, weight percent. The content of VC in the PCD structure was at least about 0.15, weight percent.

EXAMPLE 2(b)

Prior to sintering the PCD at the ultra-high pressure, the substrate comprised about 93, weight percent WC grains having a mean size of about 0.8, microns, about 7, weight percent Co and about 0.3, weight percent vanadium carbide (VC), about 0.2, weight percent $Cr_3C_2$. No abnormally large grains were evident within the region examined. The mean content of cobalt within the substrate after sintering the PCD was about 3.6, weight percent and the mean Co content within the PCD structure was in the range from about 16, weight percent to about 18, weight percent. The content of VC in the PCD structure was at least about 0.3, weight percent and the content of $Cr_3C_2$, in the PCD structure was at least about 0.2, weight percent.

Reference Specimen

Prior to sintering the PCD at the ultra-high pressure, the substrate comprised about 87, weight percent WC grains having a mean size in the range from about 1.5, microns to about 2, microns and about 13, weight percent Co. Ninety five abnormally large grains were evident within the region examined, which translates to about 9, to 10, per mm. The mean content of cobalt within the substrate after sintering the PCD was about 6.8, weight percent.

EXAMPLE 3

Reference Specimen

A PCD composite compact was sintered onto a substrate as described in Example 1,, except that prior to sintering the PCD at the ultra-high pressure, the substrate comprised about 85, weight percent WC grains having a mean size in of about 0.8, microns, about 15, weight percent Co, about 0.4, weight percent of V and about 0.5, weight percent of $Cr_3C_2$. Nine abnormally large grains were evident within the region examined. The mean content of Co within the substrate after sintering the PCD was about 7.8, weight percent.

Although the foregoing description of PCD composite compacts, tool components, production methods, and various applications thereof contain many specifics, these should not be construed as limiting the scope of the present invention, but merely as providing illustrations of some embodiments. Similarly, other embodiments of the invention may be devised which do not depart from the spirit or scope of the present invention. The scope of the invention is, therefore, indicated and limited only by the appended claims and their legal equivalents, rather than by the foregoing description. All additions, deletions, and modifications to the invention, as disclosed herein, which fall within the meaning and scope of the claims are to be embraced.

The invention claimed is:

1. A PCD composite compact comprising a PCD structure bonded at an interface to a substrate comprising cemented carbide material;
   the PCD structure comprising a mass of directly interbonded diamond grains having a mean size of at most about 4, microns, and the PCD structure comprising at least about 0.05, weight percent refractory metal or carbide of a refractory metal selected from the group comprising Ti, V, Cr, Zr, Nb, Mo, Hf and Ta;

and at least the cemented carbide material proximate the interface having a content of metallic binder material of at most about 6, weight percent of the cemented carbide material;

wherein the PCD structure contains sufficiently few large diamond grains having a dimension of at least double the D(99.99) value of the size distribution of the mass of grains, sufficiently sparsely dispersed therein, such that when a cross-section through the PCD structure, the substrate, and the interface is viewed, at most about 7, large diamond grains are evident at the cross-section along a length of at least about 10, mm of the interface.

2. A PCD composite compact as claimed in claim 1, in which the PCD structure comprises more than 15, weight percent catalyst material for diamond.

3. A PCD composite compact as claimed in claim 1, in which the diamond grains have a mean size of less than 2, microns.

4. A PCD composite compact as claimed in claim 1, in which the number of large diamond grains having a dimension of at least double the D(99.99) value of the size distribution of the mass of grains, at or proximate the interface, is at most 2, per 10, mm of length along the interface.

5. A PCD composite compact as claimed in claim 1, in which there are substantially no large diamond grains having a dimension of at least double the D(99.99) value of the size distribution of the mass of grains, along the interface.

6. A PCD composite compact as claimed in claim 1, in which the PCD structure has a transverse rupture strength of at least about 1,800, MPa.

7. A PCD composite compact as claimed in claim 1, in which the diamond grains have a mean grain size from about 0.1, micron to about 2.0, microns, and in which the PCD structure comprises PCD material having an average interstitial mean-free-path value of less than 0.60, micron, and a standard error of the catalyst mean-free-path that is less than 0.90, or less than 0.85.

8. A method for making a PCD composite compact as claimed in claim 1, the method including disposing an aggregated mass of diamond grains against a surface of a substrate body to form an unbonded assembly; in which the substrate body comprises cemented carbide material having a content of catalyst material for diamond of most about 10, weight percent; and in which the diamond grains have a mean size of at most about 4, microns; introducing into the aggregated mass catalyst material for diamond and refractory metal or carbide of a refractory metal selected from the group consisting of Ti, V, Cr, Zr, Nb, Mo, Hf and Ta; and subjecting the unbonded assembly to a pressure and temperature at which diamond is more thermodynamically stable than graphite and forming a PCD composite compact.

9. A method as claimed in claim 8, in which the substrate body comprises at least about 0.05, weight percent of refractory metal selected from the group consisting of Ti, V, Cr, Zr, Nb, Mo, Hf and Ta.

10. A method as claimed in claim 8, including introducing at least 2 weight percent of a catalyst material for diamond into the aggregated mass to form the unbonded assembly.

11. A tool component comprising a PCD composite compact as claimed in claim 1.

12. A tool component as claimed in claim 11, for a machine tool.

13. A tool as claimed in claim 11, for a drill bit for boring into the earth.

14. A tool component as claimed in claim 11, the tool component being substantially free of large diamond grains having a dimension of at least double the D(99.99)value of the size distribution of the mass of grains, proximate the interface.

15. A method of making a tool component, including providing a PCD composite compact as claimed in claim 1 and cutting the PCD composite compact through the PCD structure, the substrate and the interface to form a semi-finished element, and processing the semi-finished element to form a tool component.

16. A method as claimed in claim 15, including cutting the PCD composite compact through the PCD structure, the substrate and the interface by means of a wire EDM apparatus or a laser apparatus to form a semi-finished element, and processing the semi-finished element to form a tool component for a machine tool.

17. A PCD composite compact comprising a PCD structure bonded at an interface to a substrate comprising cemented carbide material; the PCD structure comprising a mass of directly inter-bonded diamond grains having a mean size of at most about 4 microns, and the PCD structure comprising at least about 0.05 weight percent refractory metal or carbide of a refractory metal selected from the group consisting of W, Ti, V, Cr, Zr, Nb, Mo, Hf and Ta, and more than 15 weight percent catalyst material for diamond; and at least the cemented carbide material proximate the interface having a content of metallic binder material of at most about 6 weight percent of the cemented carbide material.

18. A tool component comprising a PCD composite compact as claimed in claim 17.

19. A tool component as claimed in claim 18, the tool component being substantially free of large diamond grains having a dimension of at least double the D(99.99)value of the size distribution of the mass of grains, proximate the interface.

20. A method of making a tool component, including providing a PCD composite compact as claimed in claim 17 and cutting the PCD composite compact through the PCD structure, the substrate and the interface to form a semi-finished element, and processing the semi-finished element to form a tool component.

21. A method as claimed in claim 20, including cutting the PCD composite compact through the PCD structure, the substrate and the interface by means of a wire EDM apparatus or a laser apparatus to form a semi-finished element, and processing the semi-finished element to form a tool component for a machine tool.

22. A PCD composite compact comprising a PCD structure bonded at an interface to a substrate comprising cemented carbide material;
the PCD structure comprising a mass of directly inter-bonded diamond grains having a mean size of at most about 4, microns;
and at least the cemented carbide material proximate the interface having a content of metallic binder material of at most about 6, weight percent of the cemented carbide material;
wherein the PCD structure contains sufficiently few large diamond grains having a dimension of at least double the D(99.99) value of the size distribution of the mass of grains, sufficiently sparsely dispersed therein, such that when a cross-section through the PCD structure, the substrate, and the interface is viewed, at most about 7, large diamond grains are evident at the cross-section along a length of at least about 10, mm of the interface.

* * * * *